Dec. 10, 1929.                H. WAGNER                1,739,489
                            GARDENING TOOL
                          Filed Feb. 21, 1928
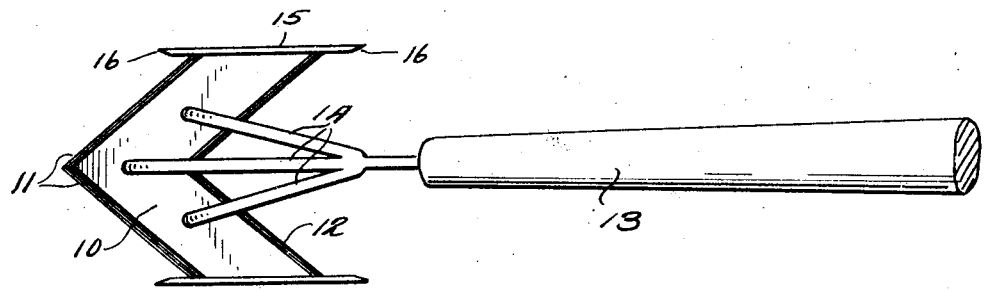
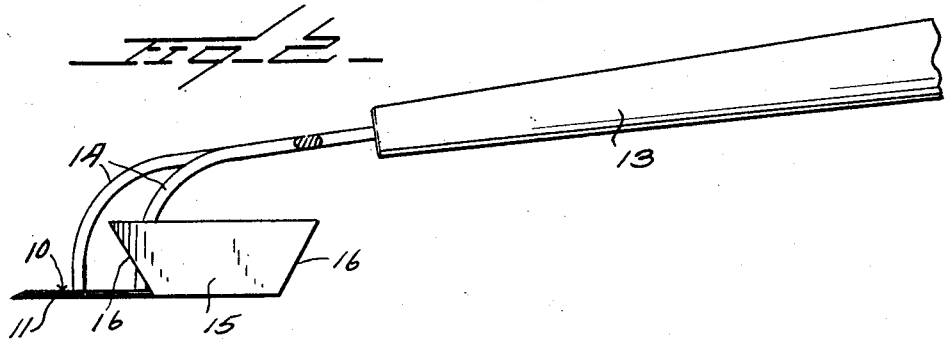
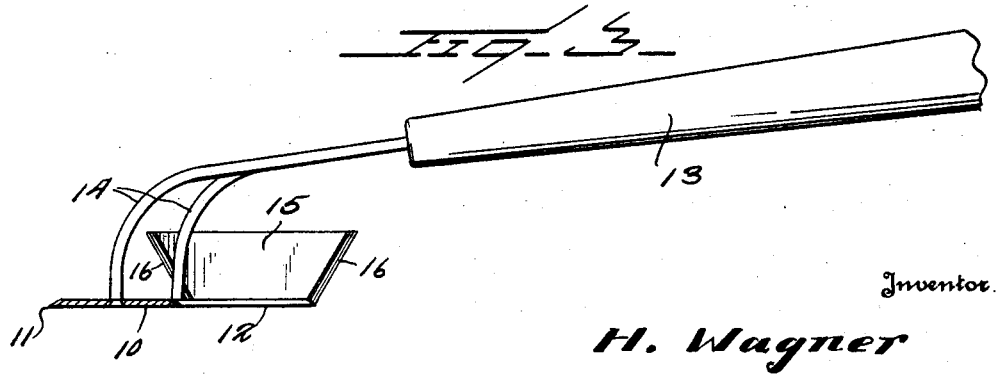
Inventor.
H. Wagner
By Watson E. Coleman
           Attorney Patented Dec. 10, 1929

1,739,489

UNITED STATES PATENT OFFICE

HENRY WAGNER, OF FALLS CITY, OREGON, ASSIGNOR OF ONE-HALF TO E. A. CAMPBELL, OF FALLS CITY, OREGON

GARDENING TOOL

Application filed February 21, 1928. Serial No. 256,007.

This invention relates to tools for cultivating gardens and weeding the same, and the general object of the invention is to provide a tool which can be used in many different positions and for many different purposes in the garden.

A further object is to provide a tool which is so constructed that it will be particularly effective in weeding, that it will enable the user to get in around plants and in small corners, but which is provided with guards preventing the tool from coming in contact with plants.

Another object is to provide a tool which is adapted for trimming the edges of lawns or flower beds and for other purposes.

My invention is illustrated in the accompanying drawing, wherein:—

Figure 1 is a top plan view of a weeding implement constructed in accordance with my invention;

Figure 2 is a side elevation thereof;

Figure 3 is a longitudinal section.

Referring to this drawing, it will be seen that the tool comprises a blade 10 which is approximately V-shaped in form so as to provide two forwardly converging, outer cutting edges 11 and two forwardly converging, rear cutting edges 12. A handle 13 is formed with three downwardly curved, divergent shanks 14 which are engaged with the blade 10 at three points, the forwardly projecting shank being engaged with the blade immediately behind the point thereof. These shanks extend upward and rearward in a curve and merge into one body or shank which is inserted in the handle 13, as previously stated. The ends of the blade are formed with the upwardly extending guards 15, these guards having cutting edges 16 at their forward and rear ends.

It will be noted that the blade is so shaped as to secure a shearing action as the tool is pushed through the ground so that any weeds that may be in front of the tool will be cut. On the other hand, a rearward movement of the tool will cause any weeds to be pushed toward the middle of the tool by the forwardly converging edges and thus the weeds will be cut. With this tool, it is almost impossible to miss any weed in the locality where the tool is being used. The tool may be used with the V-shaped portion thereof lying flat upon the ground or, where the spaces in which the tool is to be operated are contracted, the tool may be turned upon its end and the end flanges will then act as weed cutting and cultivating blades.

The three-tined or three-shanked handle gives ample room and clearance for all weeds to go through without causing any clogging of the blades, there being no lugs on the outer face of the blades to impede the movement of dirt or weeds rearward over the cutting blades. This three-tined handle also presses the cutting blades in all three directions. The use of the tool will leave the ground thoroughly cultivated and smooth, with no ridges or hollows. The upturned side flanges or guards 15 protect the plants from injury or cutting where the body of the blade is used in a horizontal position.

This tool may also be used, as before stated, for trimming borders and the edges of flower beds and the like, and under these circumstances it is obvious that a shearing cut will be made. The angular forward and rear edges of the flanges or guards 15 are sharpened so as to get close to the plants and for the purpose of producing the necessary shear cutting movement. The upper edge of the flange is left blunt so as to guard against cutting or injuring the plants.

I do not wish to be limited to the exact construction, as it is obvious that it may be changed in slight respects without departing from the spirit of the invention as defined in the appended claim.

I claim:—

A gardening tool of the character described comprising an approximately V-shaped blade having forward and rear cutting edges, the ends of the blade having upwardly turned flanged portions constituting guards and sharpened at their opposite ends, a handle, and three shanks extending from the handle and downwardly curved at their forward ends and diverging with relation to each other, the shanks engaging the flat middle portion of the blade at three different points, the middle shank projecting beyond the lateral shanks and being disposed immediately behind the apex of the V-shaped blade, the lateral shanks being substantially spaced from the guards whereby to prevent plant branches from being caught between a shank and a guard.

In testimony whereof I hereunto affix my signature.

HENRY WAGNER.